United States Patent [19]

Girden

[11] 4,245,475
[45] Jan. 20, 1981

[54] METHOD AND APPARATUS FOR PRODUCING ELECTRICITY FROM THERMAL SEA POWER

[76] Inventor: Barney B. Girden, 1281 NW. 43rd Ave., Lauderhill, Fla. 33313

[21] Appl. No.: 916,897

[22] Filed: Jun. 19, 1978

[51] Int. Cl.³ ............................................. F03G 7/04
[52] U.S. Cl. ...................................... 60/641; 60/690; 239/2 R; 417/108
[58] Field of Search ................ 60/398, 641, 650, 682, 60/690, 692; 239/2 R, 14; 417/108

[56] References Cited

U.S. PATENT DOCUMENTS

| | | | |
|---|---|---|---|
| 2,169,165 | 8/1939 | Reedy | 416/9 |
| 3,465,964 | 9/1969 | Girden | 239/14 X |
| 3,683,627 | 8/1972 | Girden | 405/52 |
| 3,741,480 | 6/1973 | Gare | 417/108 |
| 3,967,449 | 7/1976 | Beck | 60/641 |
| 4,104,883 | 8/1978 | Naef | 60/692 X |
| 4,135,364 | 1/1979 | Busick | 417/108 X |

*Primary Examiner*—Allen M. Ostrager
*Assistant Examiner*—Stephen F. Husar

[57] ABSTRACT

A method and apparatus are disclosed whereby cold subsurface water in a large body of water is upwelled by air-lifting in vertical jet streams to the surface of the body of water. The cold subsurface water eminates radially in all directions from the vertical jet streams, while floating on top of the body of water. The cold water then descends in vertical jet streams to the subsurface allowing the cycle to be repeated. The cold subsurface water brought to the surface in a number of places over a relatively large area of the body of water allows the temperature differential between the cold surface water and the warm surface water adjacent thereto and at the periphery thereof to be used by a fluid in a heat engine cycle to drive turbines and thereby generate electricity. The cold surface water also allows the production of electricity of air turbines which may be placed adjacent to the area having cold water thereon. The cold water cools the air above it creating strong winds which drive the air turbines.

5 Claims, 6 Drawing Figures

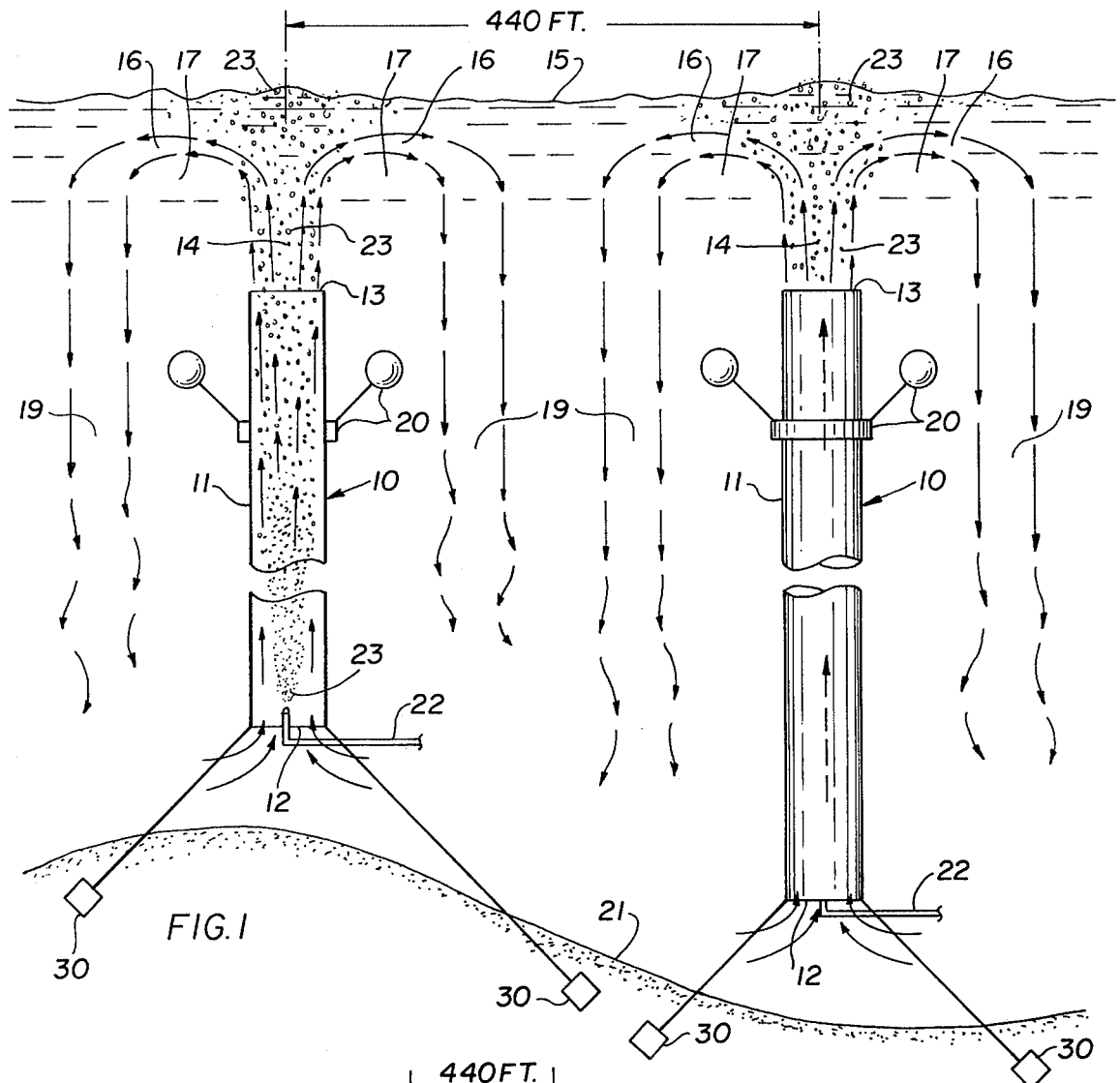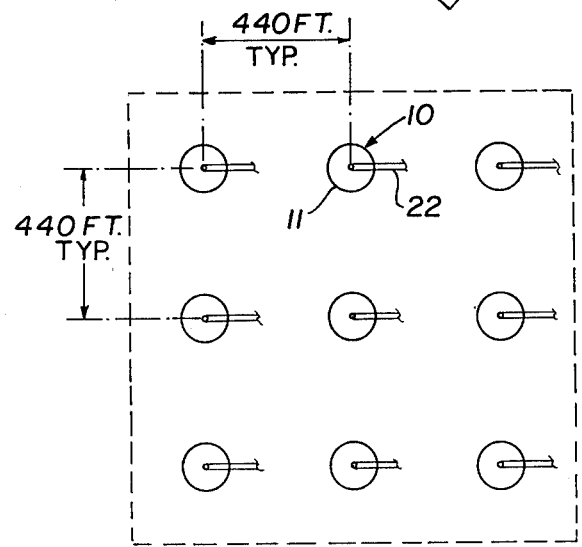

METHOD AND APPARATUS FOR PRODUCING ELECTRICITY FROM THERMAL SEA POWER

BACKGROUND OF THE INVENTION

1. Field of the Invention

This invention relates generally to a method and apparatus for producing large amounts of energy by utilizing the temperature differential between hot surface water and cold subsurface water of a large body of water, and in particular, to a method and apparatus for producing large amounts of electrical energy by air-lifting the cold subsurface water to the top of a large area of a body of water thereby creating distinct adjacent surface areas of water having a temperature differential capable of being efficiently and conveniently used to generate vast amounts of useful pollution-free energy.

2. Description of the Prior Art

The need for pollution-free energy and for energy which does not exhaust the world's natural resources is readily apparent. Energy produced by fossil fuels causes both air pollution and exhausts our natural resources. The energy produced by fissile fuels (nuclear power) causes thermal pollution of either the atmosphere or the earth's waters, not to mention the problems of radioactive waste disposal associated therewith and are yet unsolved. Solar energy is the obvious answer to our energy and pollution problems.

As stated by J. Hilbert Anderson in his keynote address on Sept. 26, 1974, at the Clean Energy Research Institute in Washington, D.C., sponsored by the Ocean Thermal Energy Conversion Program, National Science Foundation:

"Of all the sources of power, ignoring the ones that require fuel, only wind-power, geothermal power and sea thermal power are economically feasible. Of all these, since geothermal power and sea thermal power both have a high load factor, these will be the cheapest forms of power that we can ever produce . . .

I know there are a lot of difficulties in developing sea thermal power. I know this workshop will discuss many of the problems. I myself have often concentrated on the problems . . . We are now thoroughly convinced that all these problems can be solved very economically. We're more confident than ever, that this is the case and that the potential here is so great that there is simply no way to avoid starting to develop and build sea thermal power plants. This is a job that can be done, gentlemen, it must be done, and it will be done."

As of the date of this invention, it is obvious that the prophesy and dictates of Mr. Anderson have not been fulfilled. The costs of energy are on the increase. The adverse effects of the production of energy are on the increase. The ever-increasing deficit in the balance of payments between the United States and our foreign neighbors is unchecked and growing out of control. Foreign nations are depleting their natural resources, which resources cannot be replaced. Air pollution in the California area of the United States, the Tokyo area of Japan as well as other areas in the world are making these areas unlivable.

A new source of pollution-free energy is needed now. It is here and available. It involves little of the complexities of unknowns, skills, procedures, time and money that was involved in the making of the atomic bomb.

Just a few hundred feet down in our oceans there is a pollution-free self-producing, diffused solar energy ready to meet much of civilization's power needs.

A fair-sized hurricane has the power of five hundred thousand (500,000) atomic bombs of the type used on Nagasaki. It derives its energy from the accumulation of the heat of evaporation over vast areas over water. Since action and reaction are equal in opposite directions, for all the heat the vapor takes it leaves an equal amount of "cold". This cold plus the cold of winter and from the submarine artic and antartic currents and the melting of ice is "stored" below the surface in the ocean and retained under a cover of warmer water. There is no convection to cause loss of the cold.

To convert the amount of energy stored as cold in the subsurface waters of the ocean, it takes the power of a dozen Hoover Dams to blow a nine (9) mile per hour wind over the two thousand five hundred (2,500) square miles of the Los Angeles basin. Yet, all over the world, a temperature difference between land and the adjacent waters cause winds to blow over tens of thousands of miles of land and water. Thus, by controlling the wind one can make wind one of the great producers of electricity before the gas and oil "run out". Now, for the first time, and in accordance with the instant patent, winds and their speeds can be under man's control.

With expenditure of 100,000 to 200,000 horse power, enough "cold" energy could be obtained to do the work of ten (10) to twenty (20) Hoover Dams to support onshore winds, to stop offshore winds or to let the offshore winds persist if it has the desired speed. The power developed can be used to surface the cold subsurface water and develop a desired temperature difference between it and the land temperature. If the temperature decrease due to the upwelling can be controlled, one can control the sea breeze intensity. My patents granted and pending make this energy available by using the fact that the specific heat of water is more than 3,000 times that of air, and when water is not raised above its surface level, each cubic foot weighs one (1) ounce instead of 62½ pounds.

In the past, methods to utilize the temperature differential between the 40° F. cold subsurface waters and warm 85° F. surface waters have been concerned with the location of these waters as they exist in oceans or seas. Thus, large distances in the order of 1,000 feet were involved. This large distance negated the effectiveness of the various attempts to utilize the naturally occurring temperature differential; and, therefore, no efficient method exists in the prior art to tap the vast potential of thermal sea power. Yet, it is the magnitude of the sea's thermal power that makes it so important. The recoverable energy from the sea is more than enough to meet the world's energy needs for any foreseeable time.

The instant invention overcomes these problems of the prior art by causing the cold subsurface water to be upwelled to the surface of a large body of warm water, immediately adjacent to the warm surface water. The condition thus capable of being created can be used to provide a heat engine cycle with the necessary cooling and heating to drive gas turbines. And, this can be done without the need, as in the prior art, to pump the fluid of the heat engine between the surface of warm water and the depths of a sea to reach its cold water.

In my prior patents, I have disclosed a method for controlling smog, U.S. Pat. No. 3,465,964, issued Sept. 9, 1969, involving the creation of onshore winds which displaced the polluted atmosphere over adjacent shore lands. In that patent, I described a method whereby the colder subsurface water is caused to be upwelled and turbulently mixed with the surface water of the ocean at a location adjacent to a city such as Los Angeles, thereby producing a mass of cold air above the ocean. The cold air would then force a polluted inversion layer existing over the adjacent land mass to ascend and be displaced thereby by the cold clean air. Thus, solar energy transformed into sea thermal power can effectively be utilized to cleanse polluted air over coastal cities.

In U.S. Pat. No. 3,683,627, issued on Aug. 15, 1972, I described a method and apparatus for improved means for upwelling subsurface water. In that patent, it was shown that such upwelling was desirable for purposes of changing the water temperature at the surface of a body of water, or to oxygenate the water, or to cause an upward current which can raise materials such as nutrients from the ocean bottom. There, the method involved dissolving air into the water, well below the surface of the water, thereby saturating the same causing it to be more buoyant or lighter than other water in the vacinity so that a current of this lighter water is started and continues toward the surface.

In accordance with U.S. Pat. No. 3,950,030, issued Apr. 13, 1976, underwater mining was shown to be feasible by using compressed air supplied by a ship having air tubes associated with conduits extending from the vessel to the lower reaches of the ocean floor.

In all of the above-described patents, the main principle involved is that each cubic foot of subsurface water weighs exactly the same as an adjacent cubic foot of water. Thus, to raise one discrete volume of water relative to another, all that is necessary is to make it lighter in weight. In U.S. Pat. No. 3,683,627, the subsurface water was saturated with air to make it lighter. In U.S. Pat. No. 3,465,964, it was shown that a gallon of ocean water at 5° C. weighs 0.01466 pounds more than it weighs at 20° C., or less than 30 pounds per ton. Therefore, to life 30 cu. ft. of ocean water, or in actuality one ton, at the rate of 1,000 feet per minute, only one horsepower is required.

In accordance with the above, a main object of this invention is to upwell cold subsurface water to the surface of a large body of tropic water so that both cold water and warm water separately exist at the surface of the body of water.

It is another object of this invention to provide a suitable method and apparatus for upwelling a sufficient volume of subsurface water so as to create a large contiguous surface layer of cold water which floats on the surface of the tropical body of water.

Another object of this invention is to disclose a method and apparatus for converting sea thermal power into electrical energy by creating a large number of floating layers of cold water each of which is surrounded by warm tropical water and utilizing the temperature differential therebetween to provide heating and cooling of a fluid employed within a heat engine.

SUMMARY OF THE INVENTION

The invention herein harnesses the thermal power of the seas to produce massive amounts of useful energy.

In one embodiment an area of one hundred square miles of a tropical ocean is used. Within this area, vertical conduits, open on both ends, are positioned in a square array having a pitch of 440 feet and are anchored to the bottom of the sea. Compressed air is pumped to the bottom end of each of the conduits and allowed to bubble up therethrough. The bubbling causes 40° F. water to enter through the open bottom end of the conduits and to be pumped or carried up through the conduits. In this manner, the cold subsurface water is air-lifted up the conduits. Upon exiting from the conduits, the cold water and air bubbles continue upward in jet stream fashion until the surface of the ocean is reached. At this point the cold water spreads out radially in all directions. Since the air used to lift the water escapes into the atmosphere, the cold water again becomes heavier than the surface water of the ocean, and a naturally occurring downward jet stream is created whereby the cold water is returned to its thermal level below the surface. In this manner vast amounts of cold water are air-lifted to the surface and then returned to its thermal level in a continuous fashion. Thus, there is effectuated an area of one hundred square miles of tropical ocean having a surface temperature of 40° F. Of course, the temperature immediately below the surface and outside the one hundred square mile area is at 85° F.

The inventive phenomenon thus created can now be used to produce electricity. One envisioned method is to provide wind turbines adjacent to the one hundred square miles of ocean having surface water at 40° F. It is well known that the combination of cold air above the one hundred square miles and the warm air above large areas of warm water or land adjacent to the cold area produces strong winds which are capable of driving air turbines.

In another envisioned method, electrical power is produced by heat engines, the condensers of which float on the cold 40° F. water and the boilers of which are under the surface of the adjacent 85° F. water around the periphery of each area cooled by one air-lift pump. Thus, the fluid in the system comprising the heat engine, is heated to a gas in the boilers and condensed to a liquid in the condensers. Gas turbines placed therebetween are driven by the gaseous fluid and produce the electricity. By creating a large number of such areas which are spaced from each other by areas of warm water, vast unlimited amounts of electricity can thus be generated.

The present invention will be better understood and objects and important features other than those specifically noted above will become apparent when consideration is given to the following details and description, which when taken in conjunction with the drawings, describes, discloses, illustrates and shows preferred embodiments or modifications of the present invention and what is presently considered and believed to be the best modes of practicing the principles thereof.

BRIEF DESCRIPTION OF THE DRAWINGS

For a fuller understanding of the invention, reference is had to the following description taken in connection with the accompanying drawings in which:

FIG. 1 is a schematic view of a representative number of air-lift pumps illustrating the inventive method of upwelling cold subsurface water returning the same to the sea's depth;

FIG. 2 shows one array of air-lift pumps over a square portion of the sea's surface;

DESCRIPTION OF THE PREFERRED EMBODIMENT

Figure 3:
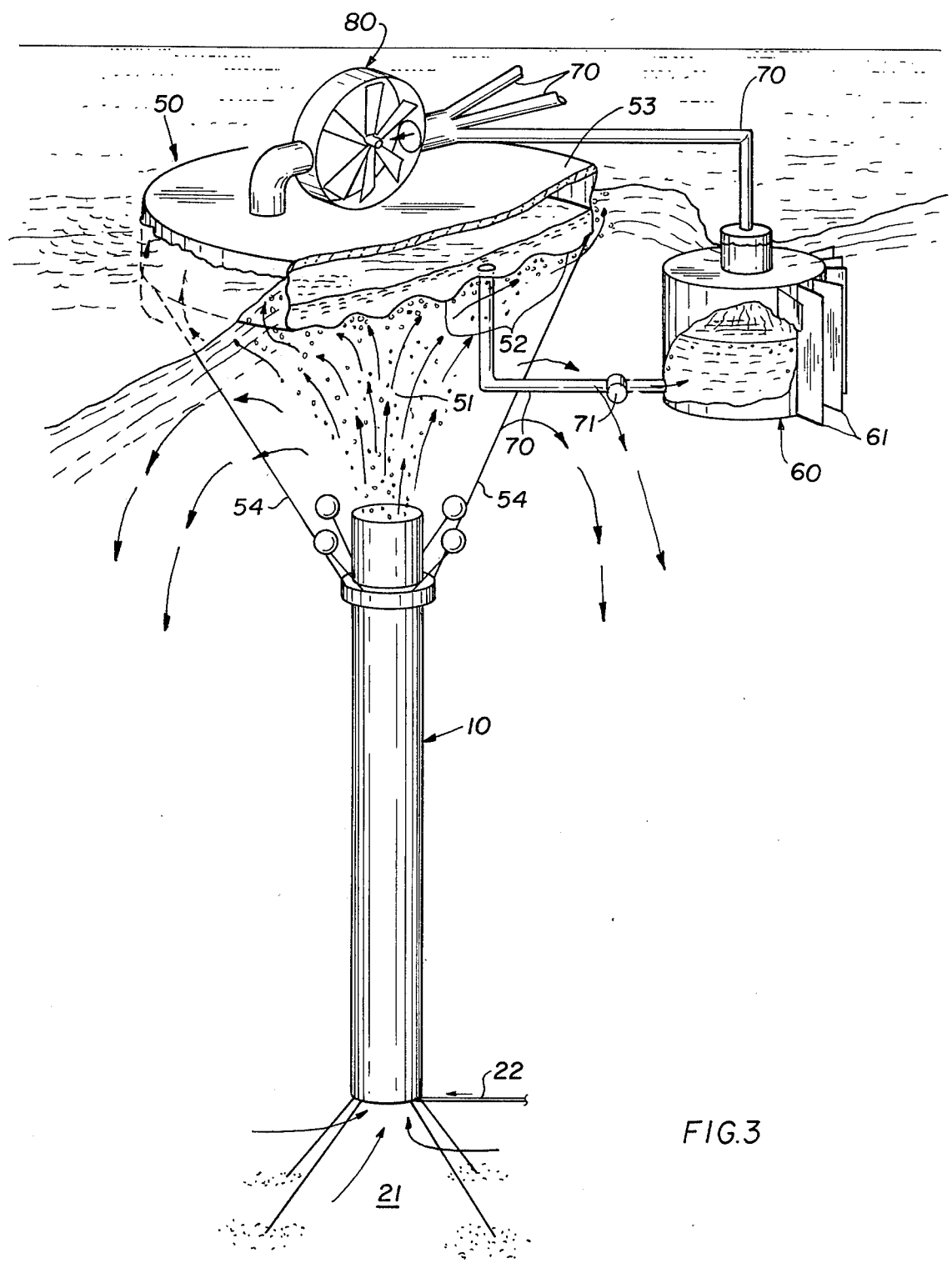
FIG. 3 schematically shows the inventive method and apparatus for converting the sea's thermal power into electricity by a heat engine.

In general the present application shows two (2) methods to turn the kenetic energy buried in the oceans' temperature differences into electricity.

1. Generate and control winds to have Wind-Turbines make electricity.

All over the world wherever land is adjacent to sizeable bodies of water, lakes as well as oceans, when there is a temperature difference between the land and the water, winds start from the colder denser atmosphere blowing towards the warmer lighter atmosphere. Depending upon the degree of difference, the winds of the land water borders can develop from breezes to gales. These winds can penetrate inland a considerable distance—for example, the sea breeze that reaches Rome and the lake breeze that penetrates the whole Chicago area;

It is important to note that the necessary factor in starting the wind is the temperature difference. A cold front is cold only by comparison. The critical factor is to develop a process that will upwell and maintain at the surface sufficient cold water to create the desired temperature differences; and, The coast of the Pacific with its underwater canyons and its deep offshore waters and the Atlantic with its drowned river valleys along the entire shore permits both coasts to have an almost unlimited number of sites for wind machines.

2. Heat engines convert the oceans' temperature differences into electricity.

In the tropics the sun keeps the surface waters at a constant 85° F., while the subsurface is maintained at a constant 40° F. Thus, just a few hundred feet down in tropic oceans there is a pollution-free, self-producing, diffused solar energy ready to meet much of civilization's power needs; and, By upwelling cold subsurface waters to the surface of a warm body of water, adjacent water surface temperatures of 85° F. and 40° F. are created. The boiler of a heat engine is placed in the 85° F. water while the condenser of the engine is caused to float on the 40° F. water. A gas turbine driven by the gas produced by the boiler produces electricity. Water can also be used to propel the turbine. The lower the pressure of the fluid in the heat engine cycle, the lower its boiling point. The coolant (40° F. water) can condense the steam causing a vacuum to propel the turbine.

In particular, in the instant invention, air-lift pumps make the cold subsurface water (40° F.) lighter than the surface water by adding enough bubbles. The air-lift pumps, by combining bubbles of air with water at depth, make the coolant lighter than the surrounding waters. In the form of a vertical jet stream, the coolant is carried to the surface where it turns into a thin, rapid, horizontal jet stream floating over the heavier, normal surface water, in circular symmetry. By the use of the air-lift pumps one hundred thousand H.P., self-produced, can maintain a self-established one hundred square mile area of water with a surface temperature in the 40's. More or less area and horsepower can be used as desired.

The pressure that caused the mixture or air and water at depth is lessened at the water surface and the bubbles gradually escape, leaving the colder surface jet stream heavier than the surrounding waters and the coolant sinks in a vertical, downward jet stream to its thermal level.

Each H.P. raises two thousand cubic feet per minute. One hundred thousand H.P. raises two hundred million cubic feet per minute to replace the descending coolant that increased its weight as its bubbles broke free. The bubbles, in leaving, break through the surface water tension and stir the air cooled by the coolant. The entire hundred square miles of surface area bubbles constantly and causes a quicker transference of cold to the air over the hundred square mile area.

Thus, all the 200,000,000 cu. ft. per minute are carried to the surface by bubbles. All the bubbles break through the water's surface tension and escape into the air. In escaping, they carry up the cold air—cold by contact with the coolant water on the surface—and cause the coolant to cool more air.

The two and a half billion square feet of cold ocean surface are constantly cooling three thousand times more air, stirred by the escaping bubbles. The specific heat of water is more than 3,000 times that of air. Each cubic foot of water can heat or cool 3,000 cubic feet of air to the same temperature degree. The weight of a cubic foot of water, not raised above its water level is one ounce, above water is is 62½ pounds. Two hundred million cubic feet of water can cool 600 billion cubic feet of air.

The temperature difference between the coolant water surface and the land causes on onshore wind of the desired speed to drive the propellers of wind-turbines for an efficient production of electricity. The temperature differences cause the wind speed, the greater the difference, the greater the speed. An excess production of electricity can be used to make hydrogen as an additional source of power.

Alternately or in conjunction with the onshore winds, the temperature difference in the 40°'s surface temperature and the temperature of the surrounding warm surface water can be used to create on-water winds to propel wind-turbines. The controlled wind speed can turn enough wind-turbines to develop as much power as that obtained from ten (10) Hoover Dams.

In addition to converting the potential energy of the oceans' temperature differences by creating winds to propel wind-turbines, the present invention encompasses the use of heat engines to utilize the oceans' temperature differences. This is accomplished by taking advantage of the tropical surface waters whose surface temperature is always 85° F. The area of Micronesia is the largest sea thermal resource in the world, five million square miles.

Each one-quarter square mile area contains nine (9) water air-lift pumps, all 440 feet apart. Heat engines can be used instead of wind-turbines.

The air-lift pumps are situated in subsurface waters of 40° F. The differences between the 85° F. surface temperature and the 40° F. in the heat engines compressor can cause heat engines to develop millions of kw. The condenser of the heat pump is attached to the nozzle or outlet end of the air-lift pump so that the 40° F. coolant keeps the inside of the heat pump's compressor at 40° F. In this case, the spread of the coolant on the water's surface is limited and permits the heat pump's boiler to set in the 85° F. surface waters. The difference between the condenser's 40° F. and the water surface's 85° F. is 45° F. This can cause the heat engine to develop millions of kw. If more coolant is needed, we can multiply the nozzles for each condenser and/or increase the size of the condenser.

The warmer surface water is all around the boiler. The water is cooled by transferring some of the heat of the boiler. There is no convection. The cooled water sinks. This heavier cooled water is washed out below the thermocline and does not enter into the warmer surface water, leaving the entire surface ready to be used.

The entire surface warmer waters can be used without lowering its temperature. Water will be pulled in laterally for miles around without drawing on the lower thermal level.

By using a 100 sq. mile area and using 100,000 H.P., the total lift is 200,000,000 cu. ft. per minute. Each sq. mile uses 1,000 H.P. Each ¼ sq. mile area uses 250 H.P.

Using four (4) air-life pumps for each ¼ sq. mile area—each pump is 660′ from its neighbors. Each pump uses approximately 60 H.P. and raises 120,000 cu. ft. per minute.

Using nine (9) air-lift pumps per ¼ sq. mile area, each pump is 440′ apart. Each pump uses approximately 25 H.P. Each pump raises 50,000 cu. ft. per minute.

Using sixteen (16) air-lift pumps for a ¼ sq. mile area, each pump is 330′ apart. Each pump uses approximately 15 H.P., raising 30,000 cu. ft. minute.

Using twenty-five (25) air-lift pumps for each ½ sq. mile area, each pump is 264′ apart. Each pump uses approximately 10 H.P. and raises 20,000 cu. ft. per minute.

The four (4) and nine (9) air-lift pump arrangements for each ¼ sq. mile area are ideal for the heat pump.

Referring now to FIG. 1 of the drawings, two (2) air-lift water pumps 10, are depicted therein. Each pump 10 comprises a conduit 11, floatation means 20 for maintaining conduit 11 in a substantially vertical position, and anchor means 30 for anchoring each conduit 11 to the floor of the body of water within which it is positioned. The body of water may be an ocean or a sea.

In FIG. 2, an array of water pumps 10 is shown in a square area representative of the oceans' surface having sides ¼ mile long. A total of nine (9) water pumps 10 are shown therein, each being spaced approximately 440 feet from each other. Each pump 10, in the outer row of the array is spaced 220 feet from the imaginary edge of the one-quarter square mile area. In this manner, any number of such arrays may be joined and each water pump 10 will be spaced 440 feet from an adjacent water pump 10.

It is envisioned that a single air compressor (not shown) supplies compressed air to each of the nine (9) water pumps 10 in a one-quarter square mile area. The air is supplied to each water pump 10 at the bottom end 12 thereof which is open. The method of ducting the compressed air to each end 12 is optional and may be accomplished by any number of ways presently known. For example, rubber or plastic supply lines may extend from a floating air compressor to the bottom 12 of the water pumps 10. Alternatively, the lines may extend to the top 13 of the water pumps 10 and be channeled therein to the bottom 12 thereof. The important point is that the compressed air be released inside the conduits 11 substantially at the bottom end 12 thereof.

The pressure of the compressed air must, of course, be greater than the pressure existing at the bottom 12 of the conduits 11. For example, assuming the depth at which the water temperature is a constant 40° F. is 1,000 feet below the surface of the ocean, then the delivery pressure at the bottom 12 of the conduits 11 should be of the order of 550 psi.

Figure 4:
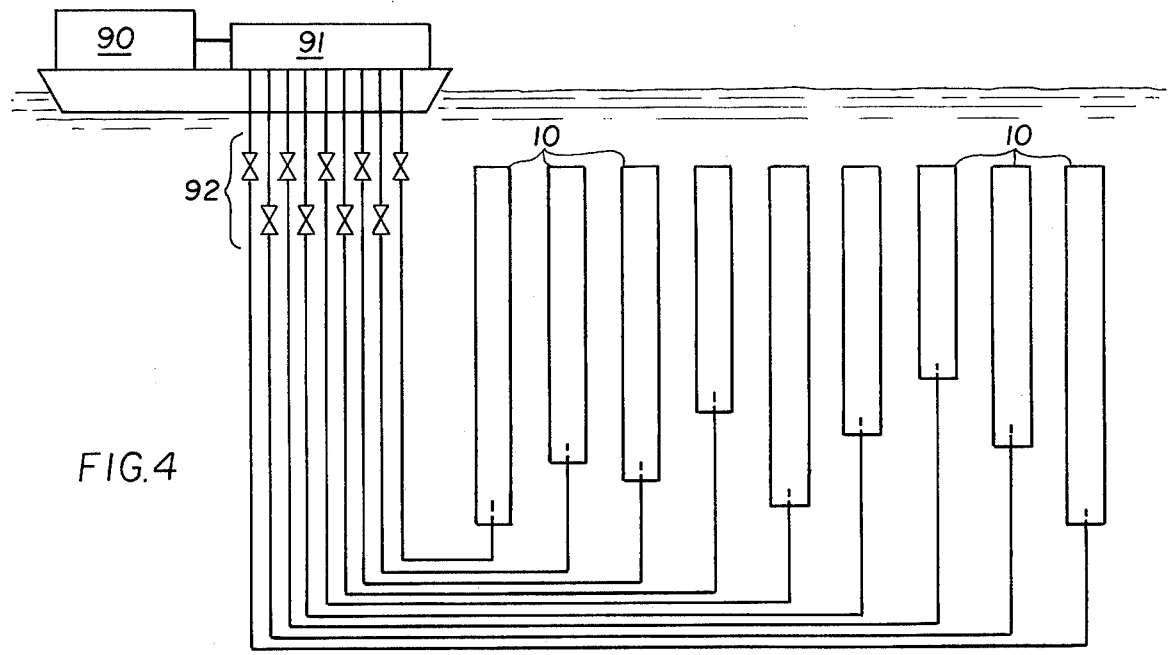
FIG. 4 shows one method and apparatus for supplying compressed air to the air lift pumps.

As shown in FIG. 1, the bottom ends 12 of conduits 11 will be located at a different ocean depth because of the irregular shape of the ocean's bottom. Therefore, as shown in FIG. 4, since one (1) compressor 90 supplies air to nine (9) water pumps 10 the different depths of the bottom 12 of the conduits 11 must be considered. It is necessary to avoid discrepencies in the amount of air delivered to each water pump 10 notwithstanding their differences in depth. This is accomplished, as shown in FIG. 4, by having a single compressor 90 and a compressed air storage tank 91 for nine (9) pumps. The tank is then maintained at a constant pressure of approximately 550 psi in the example used. pressure regulating valve 92 is also supplied at the exit of the storage tank for each air line to each conduit 11. In this manner, one compressor may be used to supply compressed air to each of the nine (9) air pumps 10 and no one (1) water pump 10 will suffer from a lack of compressed air regardless of its depth relative to any other water pump 10. Should one array of nine (9) water pumps 10 be at a substantially different depth from another array, then the presure of the compressed air supplied to it must accordingly be varied.

As demonstrated in my previous patents, above, one (1) H.P. can raise or pump 2,000 cu. ft. per minute of cold water to the surface of the ocean. Thus, 25 H.P. pumps 50,000 cu. ft. per minute. Since nine (9) water pumps 10 are used for each one-quarter square mile area, approximately 250 H.P. is required to pump 500,000 cu. ft. per minute per said area. Similarly, for a one hundred mile square area, 1,000,000 H.P. is used pumping 200,000,000 cu. ft. per minute. More or less horsepower can be used depending upon the volume of cold water that is determined or desired to be pumped to the ocean's surface.

The operation of the air-lift pumps 10 is described as follows: The potential energy of bubbles created by compressed air is converted to kinetic energy of a water jet. Each bubble in steady motion exerts a force on the surrounding water equal to the weight of the water displaced. Thus, the farther the air source is located below the water surface, the greater will be the potential energy of the bubbles.

The resulting flow pattern consists of a vertical jet of water and bubbles rising from the air source. The momentum of the vertical jet increases with distance away from the source. Thus, applications using air bubbles are more efficient at deep submergence. Much less air is required in deep water installation than in the shallow one. Most of this effect is laid to the increase in eddy velocity. The ratio of water discharge to air discharge increases with depth and decreases with increasing air discharge. Upon reaching the water surface, the momentum of the water jet is converted into a laterally spreading surface jet which is losing the bubbles. Within this central core the stream lines change from predominantly vertical to essentially horizontal.

Again referring to FIG. 1, the compressed air is discharged at the bottom end 12 of each water pump 10.

The bubbles thus released act upon and begin to pump the 40° F. water immediately above. As more bubbles are released, more cold water is being pumped. The process continues with the cold water being pumped increasing in velocity as it approaches the upper or discharge end 13 of conduits 11. The momentum thus created causes the cold 40° F. water to continue rising in a vertical stream 14 notwithstanding the nonexistence of a conduit at this location which is desirous so as not to interfere with navigation. Upon reaching the surface 15 of the ocean, the momentum of the stream 14 necessarily converts into a horizontal stream 16 of cold water which "floats" over the warm upper surface 17 of the ocean.

The floating horizontal stream of cold water is constantly giving up its bubbles which break through the tension of the water's surface. Having lost the buoyancy provided by the bubbles of air, the cold water again becomes heavier than the warm water and sinks in a stream to its thermal level. A circular path is thus effectuated whereby cold 40° F. water is air-lifted to the surface where it spreads horizontally and then descends allowing the cycle to be repeated. The net effect is the creation of a contiguous layer of cold 40° F. water on top of a one-quarter square mile area of ocean surface. And, by joining similarly created additional one-quarter square mile areas, a contiguous layer of cold water on top of one area of one hundred square miles or more can be attained.

The means 30 used to anchor the air pumps 10 to the bottom of the ocean floor may comprise any number of devices as are presently known provided it is sufficiently strong to withstand all the loads imposed thereon and is non-corrosive. Floatation means 20 also comprises apparatus which is within the present state of the art and presently known. The obvious function of floatation means 20 is to keep the water pumps 10 vertical and to provide an adequate amount of vertical stability thereto.

Having created a contiguous layer of cold 40° F. water over a large area of an ocean, all that remains is to utilize the phenomenum thus created into useful energy. In one embodiment, this is relatively simple when it is realized that what has been mechanically created is what is also accomplished by nature by the upwelling waters of the California current that chills the breeze which is then drawn to the Golden Gate by the heat of the interior California area during the summer. This gives San Francisco its cool summers.

All over the world wherever land is adjacent to sizeable bodies of water, lakes as well as oceans, when there is a temperature difference between the land and the water, winds start from the colder denser atmosphere, blowing towards the warmer, lighter atmosphere. Depending on the degree of temperature difference, the winds of the land-water borders can develop from breezes to gales. These winds can penetrate inland a considerable distance—for example, the sea breeze that reaches Rome and the lake breeze that penetrates the whole Chicago area.

It is important to remember that the necessary factor in starting the wind is the temperature difference. The critical factor is to develop a process that will upwell and maintain at the surface sufficient cold water to create the desired temperature differences, which process has been above described.

Figure 5:
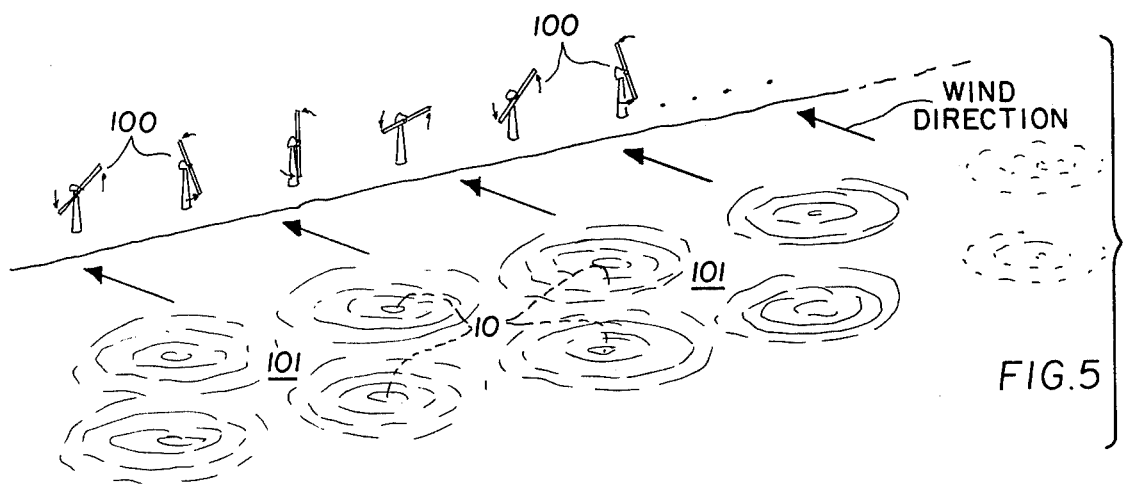
FIG. 5 illustrates the inventive method of producing electricity by land based aeroturbines; and, FIG. 6 illustrates the inventive method of producing electricity by water based aeroturbines.

There was a mature technology for windpower sixty (60) years ago. In 1915, 100 Megawatts of electricity was being generated by windpower in Denmark. Steady improvements were made through the 1950's directed toward large scale application. Conceptual designs using aeroturbines to produce 160 billion kilowatt hours of electricity per year has recently been completed for the offshore New England region. The limiting factors in the large scale application of windpower are a combination of available wind energy and weather modification. The creation of strong, even gale sized onshore wind as demonstrated above now enables the practical conversion of windpower into electricity. And, as shown in FIG. 5 as applied in this invention, the electrical energy is produced by the combination of onshore winds thus produced and the placing of a large number of closely spaced aero turbines 100 on the shore adjacent to the large area of ocean surface 101 having the cold 40° F. water thereon.

Figure 6:
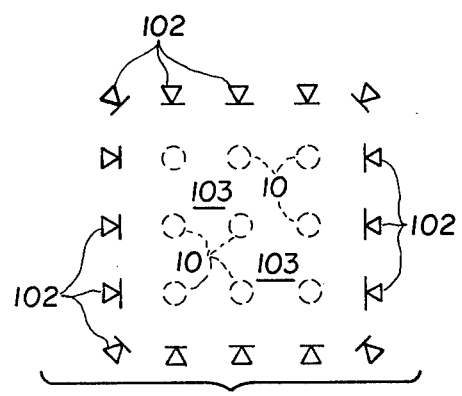

An alternate conversion method is envisioned as shown in FIG. 6 whereby the large ocean area of cold surface water is created offshore so that the strong winds produced do not adversely affect the land mass. In this alternate method, the aero turbines 102 are positioned around the periphery of the cold water area 103. This method would, however, be less efficient than the former because of the fact that the temperature of the air over the normal water is, in general, less warm than the temperature of the air on land.

In another embodiment, the energy is converted by the use of heat engines as shown in FIG. 3. Preferably, this embodiment is used with tropical oceans having a normal constant surface temperature of 85° F. and a subsurface temperature of 40° F.

As shown in FIG. 3, a floating condenser 50 is positioned over a water pump 10 so as to be floating in and be in heat transfer contact with the 40° F. upwelled water. The condenser 50 may be anchored (not shown) to the nozzle or outlet end of the water pumps 10 so that the effluent of the air-lift pump directly impinges upon the undersurface of condenser 50. If necessary, additional floatation devices 51 may be attached to the condenser 50. The undersurface 52 of the condenser 50 is shaped to provide a maximum of heat transfer area. The upper surface 53 thereof is insulated to minimize heat input thereto from the sun and to otherwise maintain the cold temperature within condenser 50. As previously stated, the size of condenser 50 is to be consistent with the power output from the heat engine.

One or more boilers 60 which are associated with each condenser 50 also have surfaces 61 which are intended to maximize heat transfer from the 85° F. water to the fluid therein which may be propane, amonia or other like substance. Boilers 60 and condenser 50 are operatively connected by appropriate pipeing 70 and a condensate pump designed to flow the liquid from condenser 50 into boilers 60. One or more gas turbines 80 are also operatively connected between condenser 50 and boilers 60.

In operation, for example, condenser 50 is cooled by 200,000,000 cu. ft. per minute of 40° F. water, which as previously is upwelled by a water pump 10. If more coolant flow is required, the horsepower input to the water pump 10 is increased. The effective size of the boilers 60 and the condenser 50 are also variable and may therefore be adjusted to achieve the maximum or the most efficient amount of energy to be derived from the system.

The hot 85° F. water surrounding boilers 60 heats the fluid therein to a gaseous-state, which drives turbine 80.

The gas then flows into condenser 50 where it is liquified by the cold 40° F. water in contact therewith. Boilers 60 receive the liquid from condenser 50 allowing the cycle to be continuously repeated.

By joining a large number of such heat pumps within, for example, a one hundred square mile area, vast amounts of electricity can be generated.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. A method of producing useful electricity from the thermal power of a large body of water having cold subsurface water and surface water which is warmer than the subsurface water, comprising the steps of:
  upwelling cold subsurface water to the surface of said large body of water creating an area on the surface thereof having cold water thereon and being surrounded by the warmer surface water of said large body of water,
  utilizing compressed air to upwell said cold subsurface water by releasing said compressed air at a lower portion of one or more substantially vertical conduits having an opening at their upper and lower portions, the lower portion or portions thereof being located at a depth within said large body of water at which there exists subsurface water which is substantially colder than said surface water, said one or more vertical conduits having a compressed air storage tank and pressure regulating valving so as to prevent compressed air starvation because of a different depth location of the lower portion of one conduit relative to another conduit;
  utilizing said area having cold subsurface water thereon and said surrounding substantially warmer surface water to generate electricity; and
  including the step of generating electricity by a heat engine, said heat engine including a condenser and said condenser being floatingly positioned in the area having cold subsurface water thereon at a location directly above the outlet of said vertical conduit, said heat engine further including boilers and said boilers being positioned within said warm water surrounding said area having cold subsurface water thereon, the output of said boilers being operatively connected to a turbine generator which produces electricity and is operatively connected to said condenser.

2. The method of claim 1, including the steps of combining a plurality of areas having cold water thereon and a vertical conduit having a heat engine associated therewith within a large area of said large body of water so as to produce a large amount of electricity.

3. The method of claim 2 including the steps of positioning at least one aero turbine in said warm water surrounding said plurality of areas having cold subsurface water thereon said at least one areo turbine being driven by winds created by the phenomena of thermal convection which causes the heavier colder air over said areas having cold subsurface water thereon to blow in a horizontal direction toward the lighter hotter air over the warm water surrounding said areas having cold subsurface water thereon.

4. Apparatus for producing useful energy from the thermal power of a large body of water having cold subsurface water thereon with a substantially constant temperature and surface water which is substantially warmer than said subsurface water comprising means for creating an area having cold subsurface water thereon within said large body of water by air lifting said cold subsurface water to the surface of said large body of water including:
  an air compressor means,
  a compressed air storage tank means operatively connected to said compresser means,
  a preset pressure regulating valve means between said compresser means and said tank means and operatively connected therebetween,
  vertical conduit means comprising a plurality of vertical conduits spaced approximately an equal distance from each other, each of said conduits having an open upper end and an open lower end, and each being anchored to the floor of said large body of water, with said lower end of each being positioned within said cold subsurface water having a substantial constant temperature and said upper end of each of said conduits being located below the surface of said large body of water and said conduits being spaced from one another in a pattern and at generally equal distances from each other, each conduit creating a separate area having a cold subsurface water thereon with each separate area being surrounded by normal water of said large body of water,
  an air line supply means operatively connected to said storage tank means and said bottom end of each of said conduits so as to discharge compressed air within each of said conduits,
  means for utilizing said area having cold subsurface water thereon and surrounding warmer water of said large body of water to produce electricity,
  said plurality of conduits being supplied compressed air from said air compresser means;
  said air line supply means including means for assuring a constant flow of compressed air to each conduit regardless of the depth of the bottom end of each conduit at which location said compressed air is supplied, and
  said means for securing a constant flow of compressed air to each of said plurality of conduits comprising pressure valve regulating means operatively connected between said storage tank means and in said air line supply means; and
  said means for producing electricity comprising a plurality of heat engines, each of said heat engines including a condenser and means for floating each of said condensers in its associated area having cold subsurface water thereon at a location directly above the outlet of said associated vertial conduit, and each of said heat engines including one or more boilers which are positioned within said warm water surrounding each of said areas having cold subsurface water thereon, the output of said boilers being operatively connected to a turbine generator which produces electricity and is operatively connected to said condenser.

5. The apparatus as set forth in claim 4 wherein the fluid within said heat engine comprises water at a very low pressure so that it has a boiling point low enough to be boiled by the normally warm waters of tropic oceans.

* * * * *